United States Patent
Liang et al.

(10) Patent No.: US 7,225,291 B2
(45) Date of Patent: May 29, 2007

(54) STORAGE CONTROLLING AND JUDGING METHOD OF FLASH MEMORY

(75) Inventors: Ming-Nen Liang, Taipei (TW); Chee-Kong Awyong, Taipei (TW); Khein-Seng Pua, Taipei (TW)

(73) Assignee: Phison Electronics Corp., Hsinchu Hsien (TW)

( * ) Notice: Subject to any disclaimer, the term of this patent is extended or adjusted under 35 U.S.C. 154(b) by 234 days.

(21) Appl. No.: 10/709,167

(22) Filed: Apr. 19, 2004

(65) Prior Publication Data

US 2005/0235097 A1    Oct. 20, 2005

(51) Int. Cl.
    G06F 12/00    (2006.01)
(52) U.S. Cl. ..................... 711/103; 711/154
(58) Field of Classification Search ............... None
    See application file for complete search history.

(56) References Cited

U.S. PATENT DOCUMENTS

2005/0005058 A1*   1/2005   Gan et al. .............. 711/103
2005/0144360 A1*   6/2005   Bennett et al. .......... 711/103

* cited by examiner

Primary Examiner—Reginald Bragdon
Assistant Examiner—Thanh D. Vo

(57) ABSTRACT

A storage controlling and judging methods of flash memory is provided. According to an aspect of the present invention, the flash memory comprises plurality sets of mother and child blocks for temporarily saving the written data in order to increase the saving/retrieving speed of the flash memory. According to another aspect of the present invention, the correlation concept of the mother and child block is used to substantially reduce the erase frequency for extending the service life of the flash memory.

7 Claims, 19 Drawing Sheets

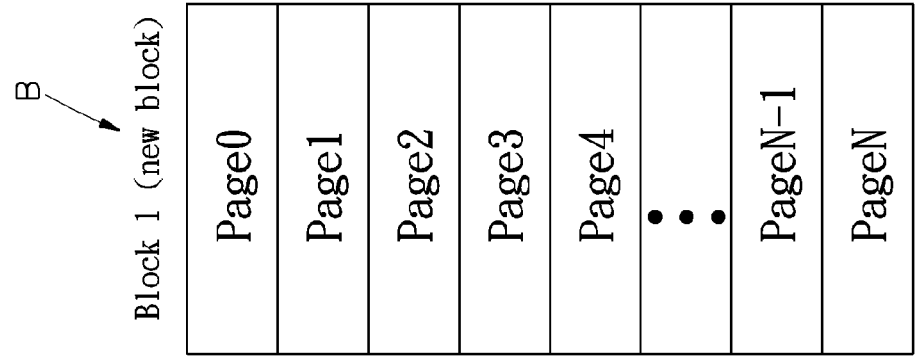
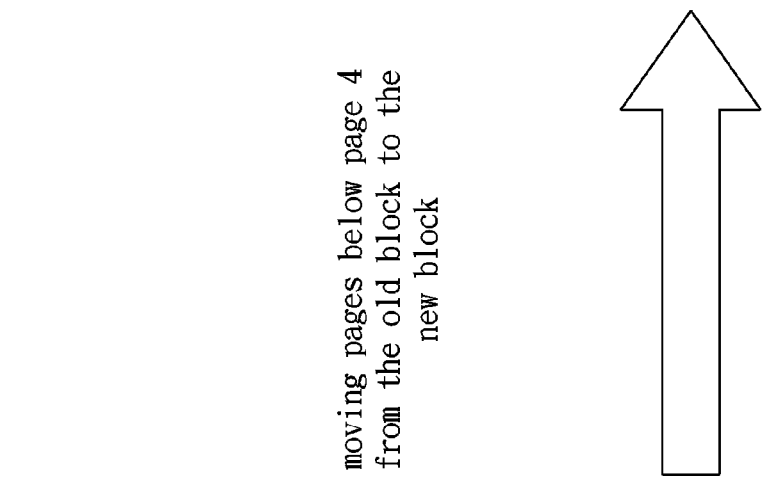
PRIOR ART
FIG.5

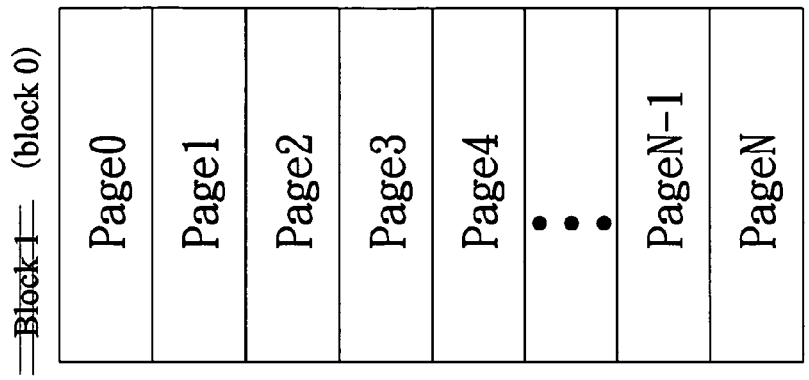
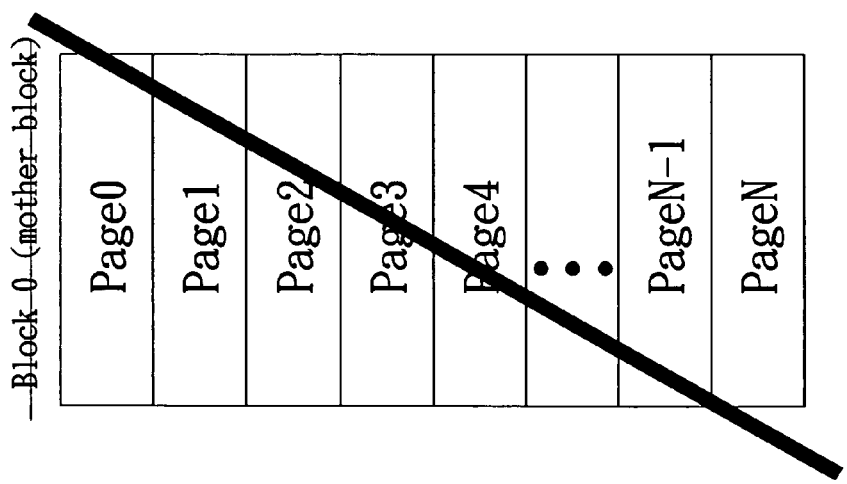
erasing the old block and replacing the block 0 by the new block.
PRIOR ART
FIG. 6

STORAGE CONTROLLING AND JUDGING METHOD OF FLASH MEMORY

BACKGROUND OF INVENTION

The present invention relates to a memory device, and more particularly to a storage controlling and judging method of flash memory capable of reducing the erasing frequency of the flash memory to extend the service life thereof.

Presently, the flash memory has become popular because of its advantageous features, namely, nonvolatile, shockproof, high storage capacity and others. Among many portable devices, the flash memory has taken the prominent place of EEPROM or the memory, which require battery. As the semiconductor technology has become mature nowadays, the storage capacity and transmission speed of the flash memory have been far upgraded then ever, and therefore the flash memory is applied in a broad field replacing the conventional storage media, such as the hard disk driver.

However, the flash memory has the hardware characteristics circumscription, the flash memory requires a new space management method and an efficient erasing strategy to evenly erase the storage block and reduce erase frequency to substantially upgrade the efficiency, extend the service life and reduce the power consumption of the system. Bad management method of the flash memory storage device could increase the cost and shorten the service life thereof.

Due to physical characteristics of the flash memory, after about a million times of erase operation, the flash memory gets damaged and should be replaced. Therefore, to reduce the erase frequency is a way for extending the service life of the flash memory. Referring to FIGS. 1, 2, 3, 4, 5 and 6, a conventional data writing method is shown, wherein when the manager prepares to write two pages from page 3 of block 0A into the flash memory, the flash memory finds a new block 1B and defines block 0A as an old block and moves the pages above page 3 of block 0A to block 1B; then the manager writes the page into page 3 and page 4 of block 1B and moves the pages below page 4 of block 0A to block 1B, finally, block 0A is erased and is replace by block 1B to complete writing.

A new block is required each data writing operation then the old block is erase, accordingly, the frequency of erase is higher and therefore the chances of damaging the flash memory is higher. Therefore, how to reduce the erase frequency for extending the life span of the flash memory, as well as increasing the storing speed thereof has become the important target for the manufacturers in the field.

SUMMARY OF INVENTION

Accordingly, in the view of the foregoing, the present inventor makes a detailed study of related art to evaluate and consider, and uses years of accumulated experience in this field, and through several experiments, to create a new storage controlling and judging method of a flash memory. The present invention provides an innovated cost effective storage controlling and judging method of a flash memory, which is capable of reducing the erase frequency for extending the service life of the flash memory.

According to an aspect of the present invention, the flash memory comprises plurality sets of mother and child blocks for temporarily saving the written data in order to increase the saving/retrieving speed of the flash memory.

According to another aspect of the present invention, the correlationship concept of the mother and child block is used to substantially reduce the erase frequency for extending the service life of the flash memory.

BRIEF DESCRIPTION OF DRAWINGS

For a more complete understanding of the present invention, reference will now be made to the following detailed description of preferred embodiments taken in conjunction with the following accompanying drawings.

FIG. 5 is a view showing the step 5 of the conventional data writing method.

FIG. 6 is a view showing the step 6 of the conventional data writing method.

DETAILED DESCRIPTION

Figure 1:
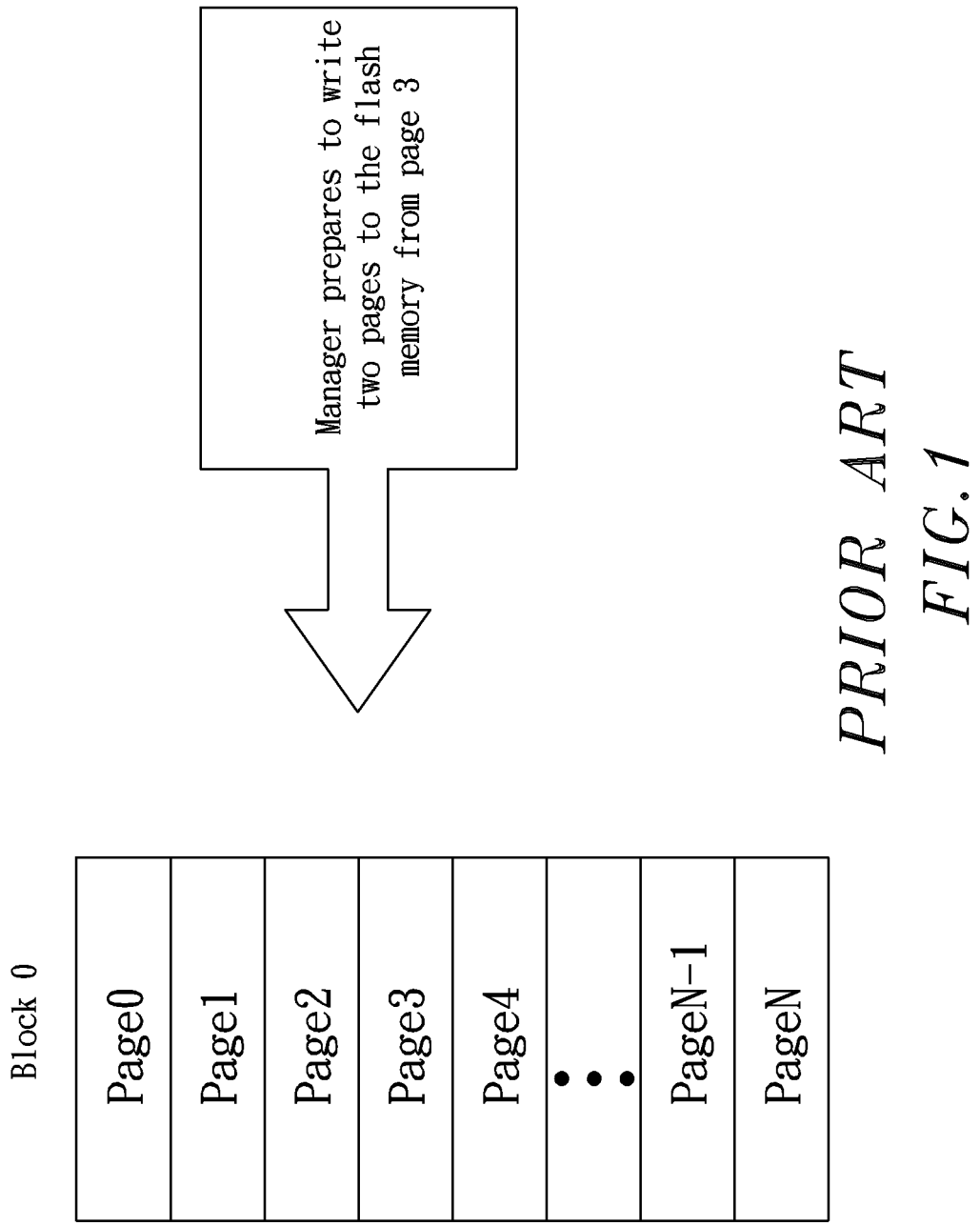
FIG. 1 is a view showing the step 1 of a conventional data writing method.
Figure 2:
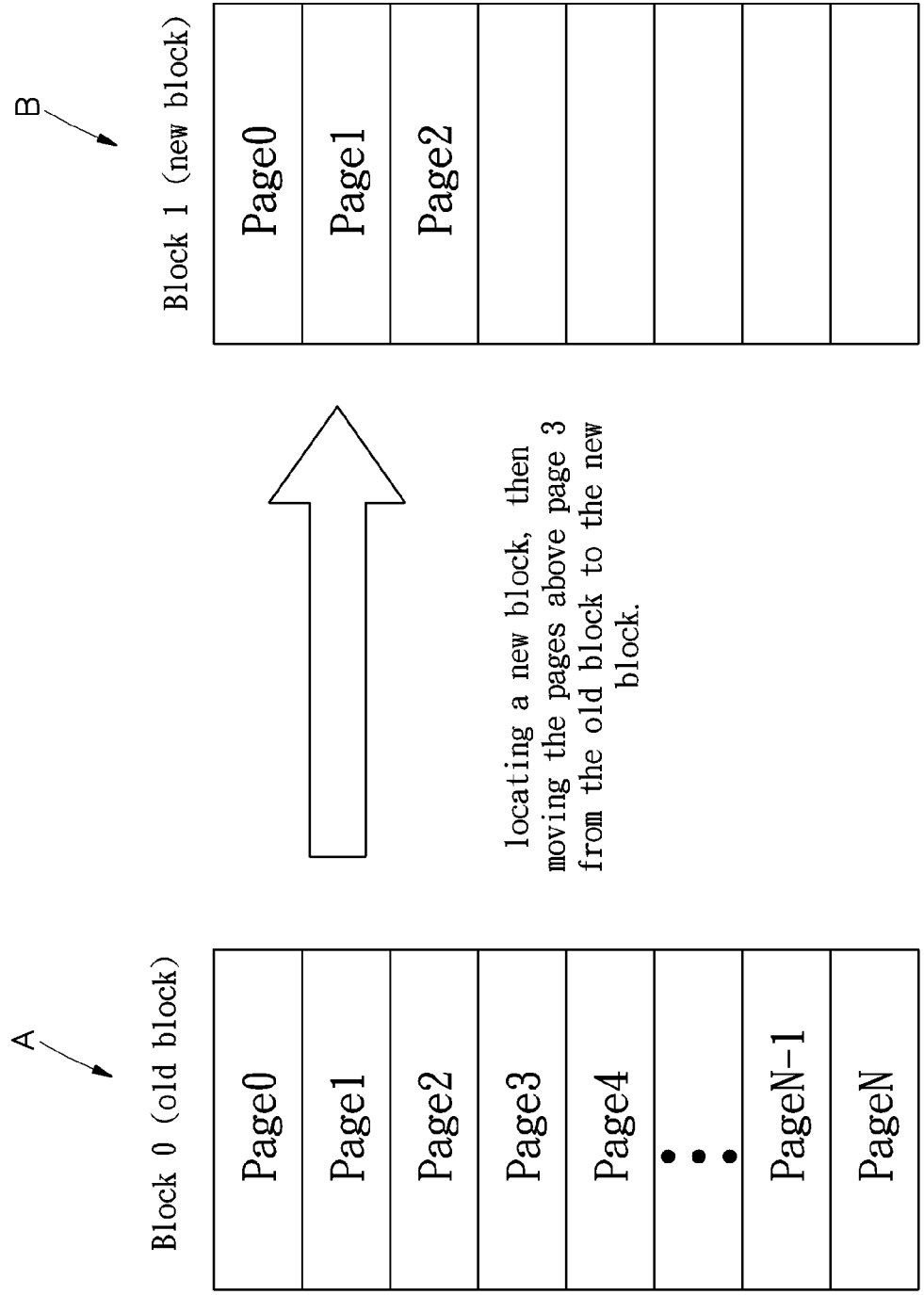
FIG. 2 is a view showing the step 2 of the conventional data writing method.
Figure 3:
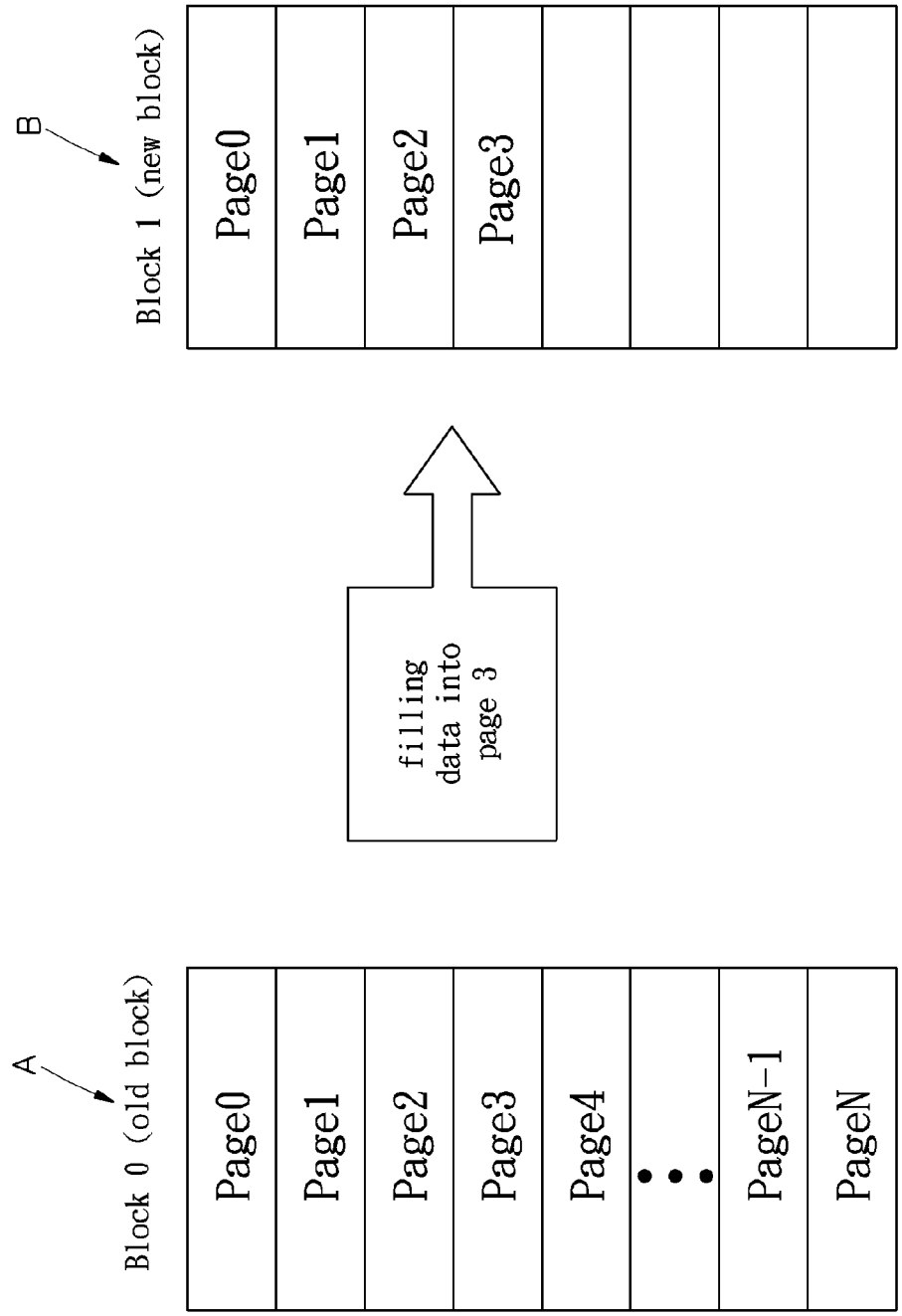
FIG. 3 is a view showing the step 3 of the conventional data writing method.
Figure 4:
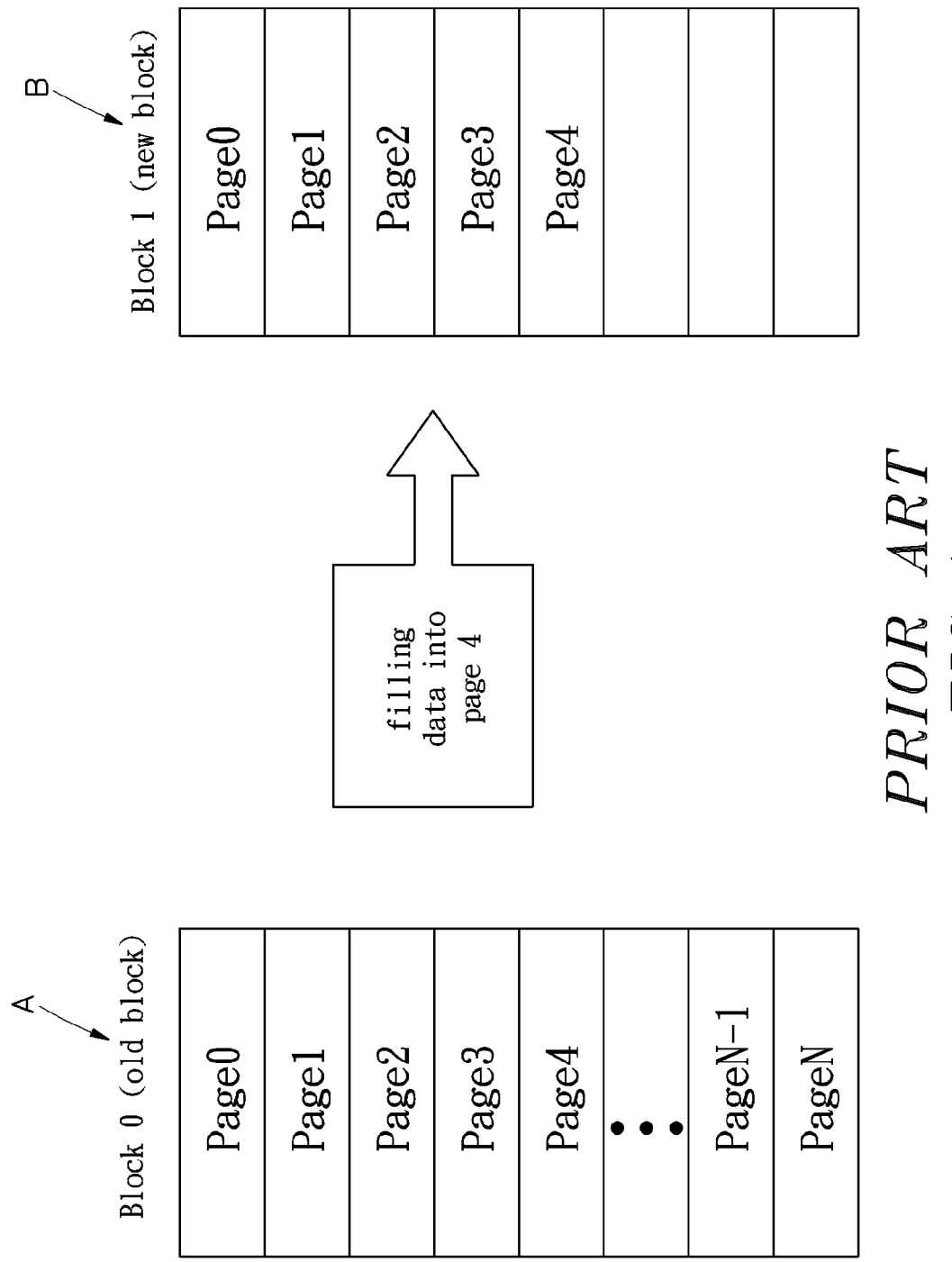
FIG. 4 is a view showing the step 4 of the conventional data writing method.

Reference will be made in detail to the preferred embodiments of the invention, examples of which are illustrated in the accompanying drawings. Wherever possible, the same reference numbers are used in the drawings and the description to refer to the same or like parts.

Figure 7:
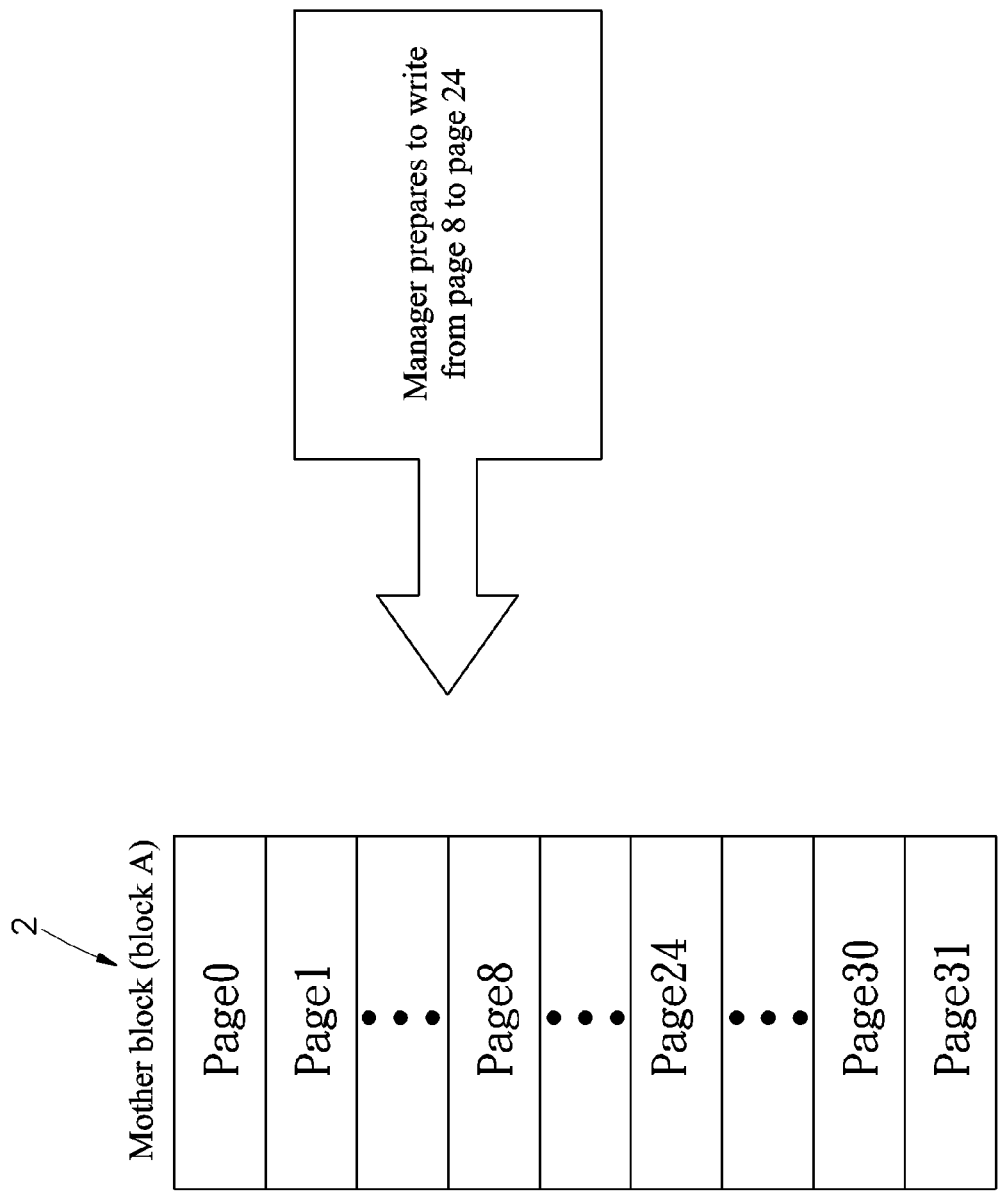
FIG. 7 is a view showing the step 1 of creating a mother and a child block according to an embodiment of the present invention.
Figure 8:
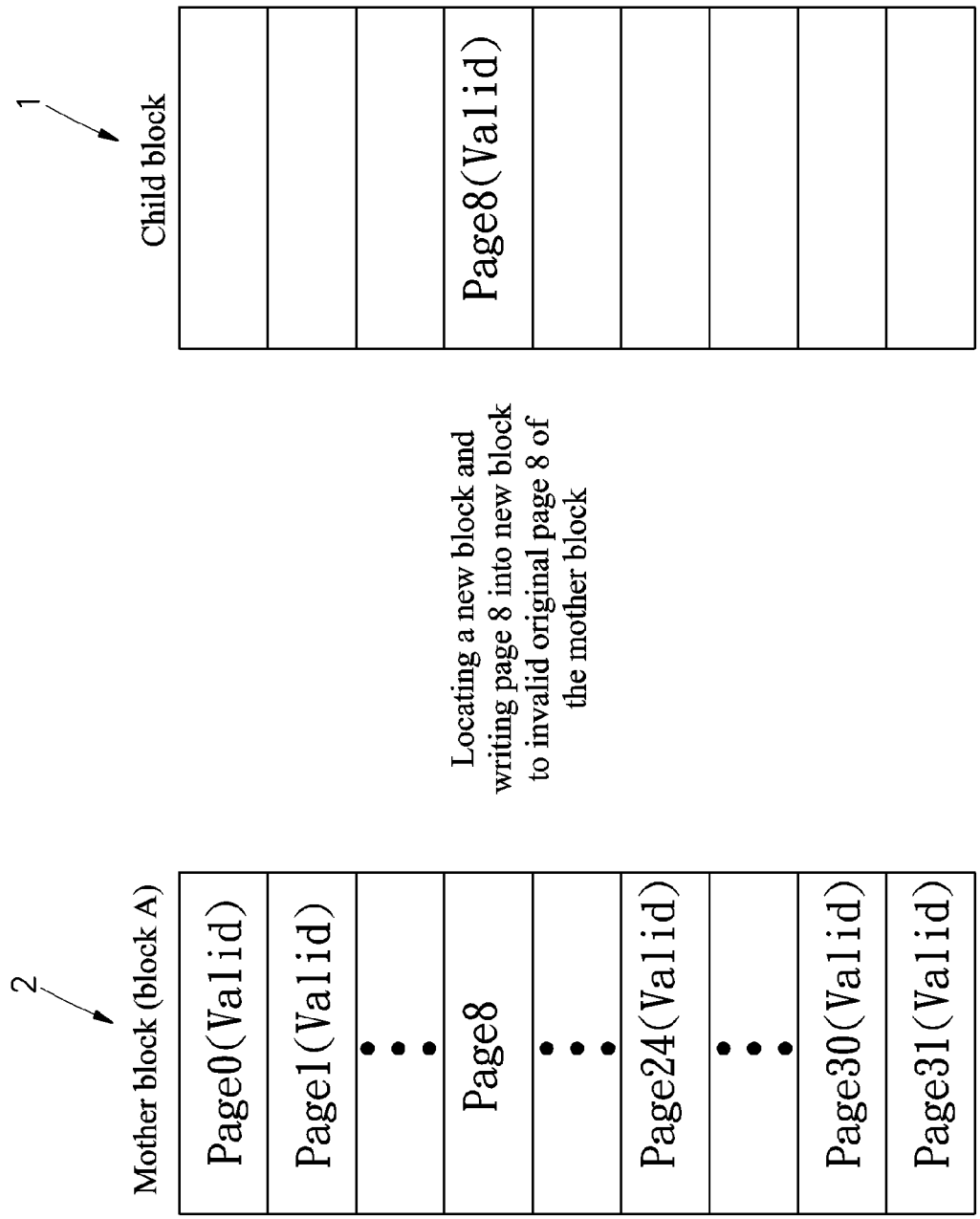
FIG. 8 is a view showing the step 2 of creating a mother and a child block according to an embodiment of the present invention.
Figure 9:
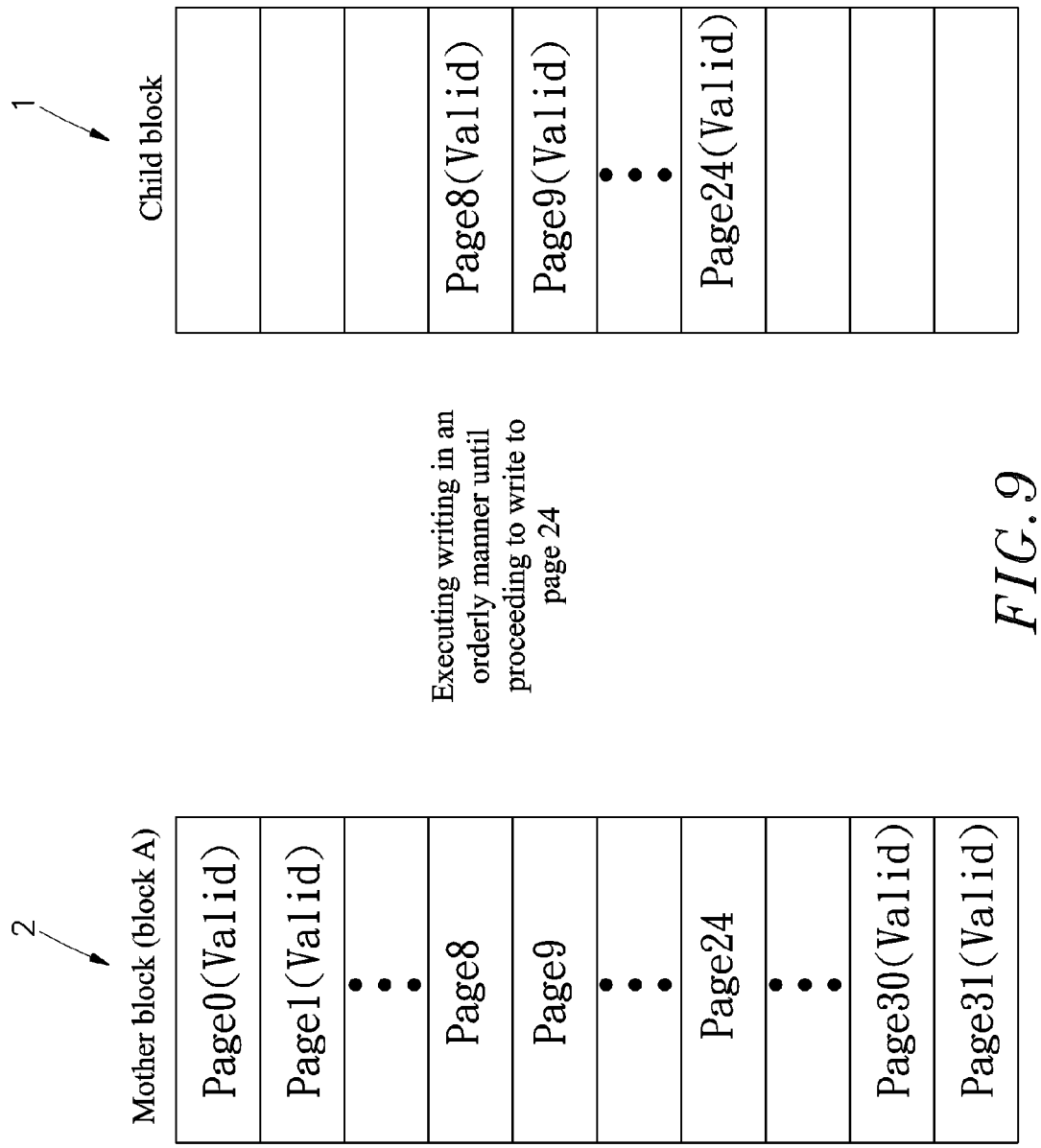
FIG. 9 is a view showing the step 3 of creating a mother and a child block according to an embodiment of the present invention.
Figure 10:
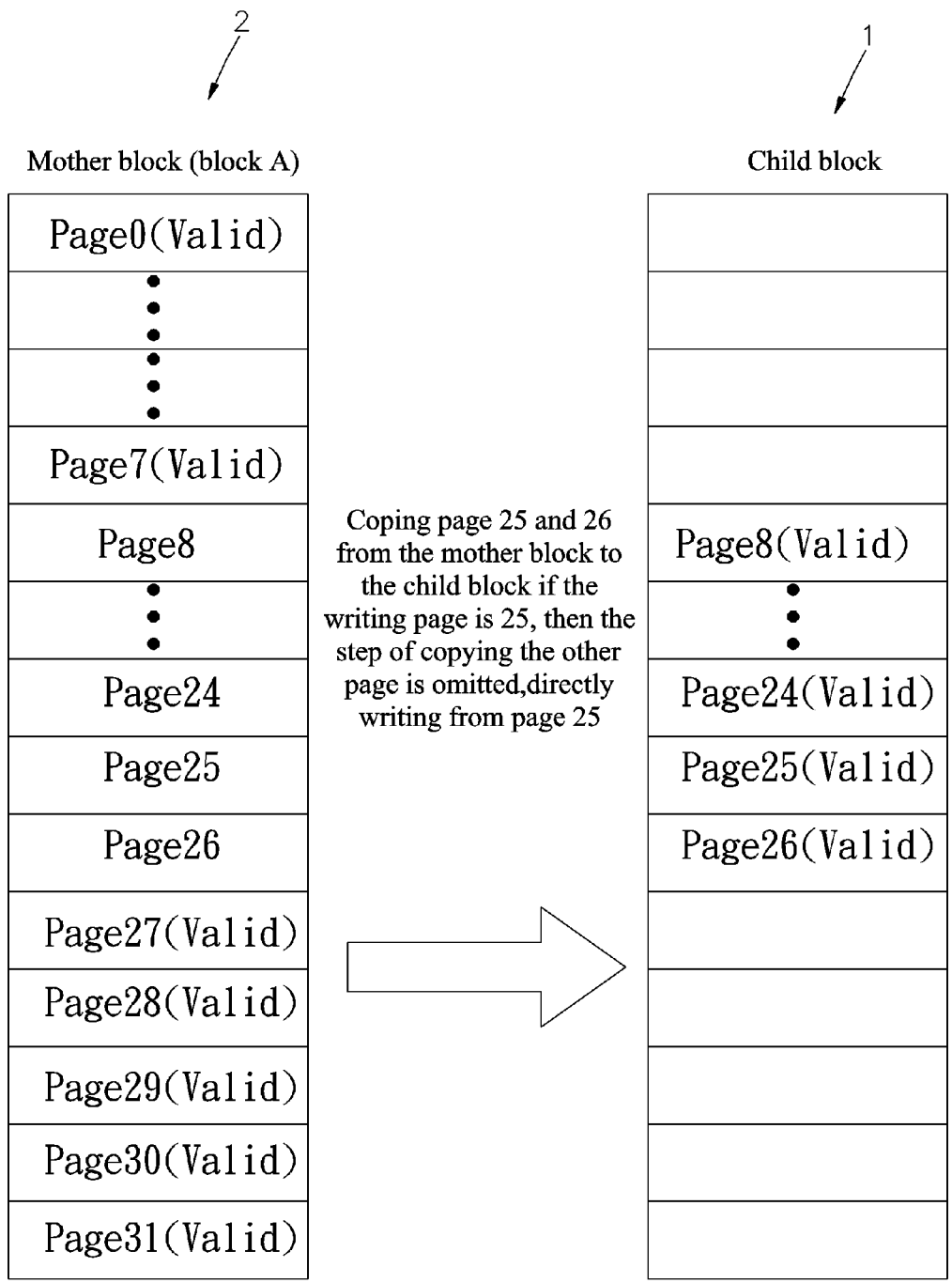
FIG. 10 is a write judging step 1 of a mother and a child block according to an embodiment of the present invention.
Figure 11:
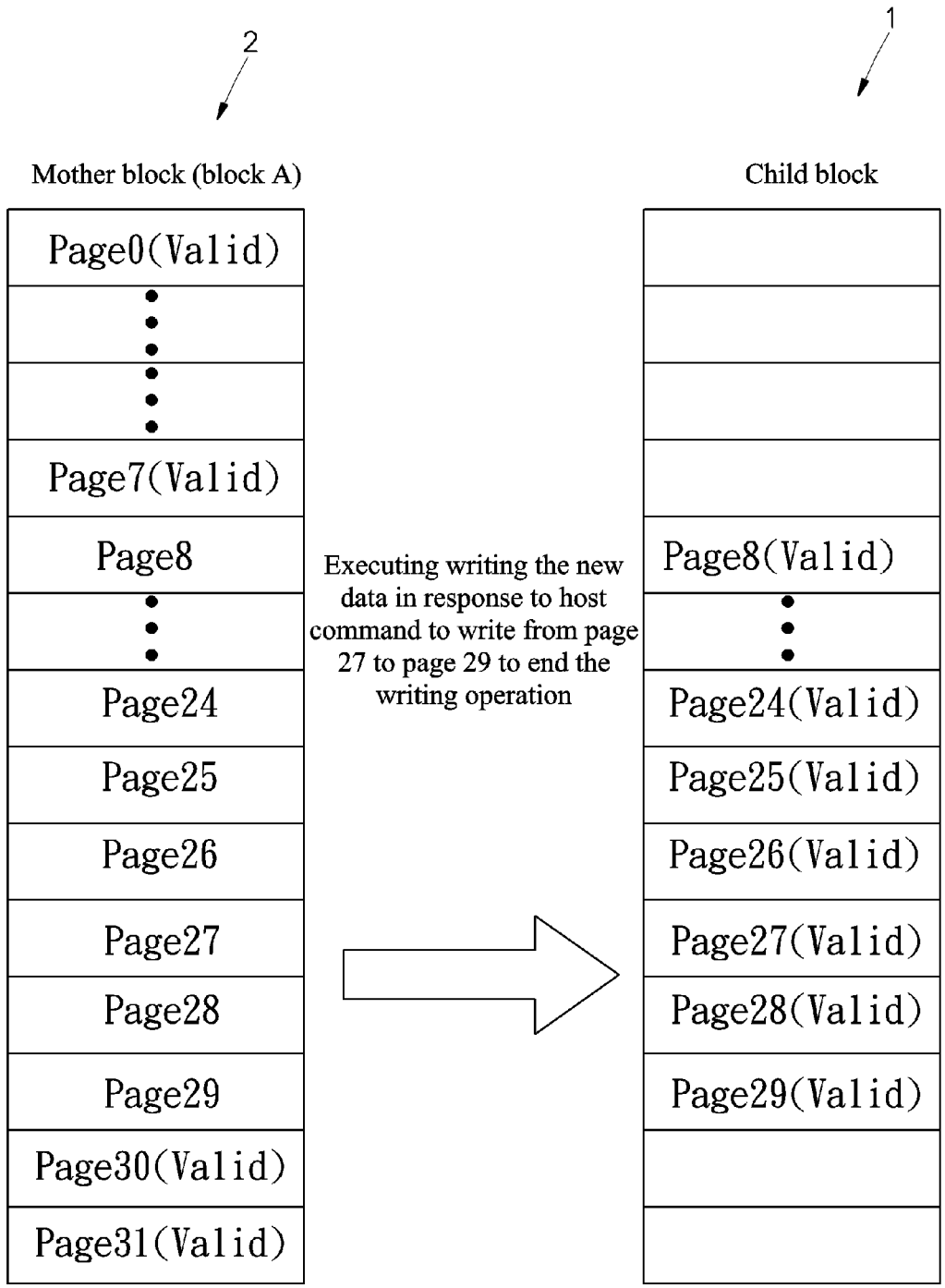
FIG. 11 is a write judging step 2 of a mother and a child block according to an embodiment of the present invention.
Figure 12:
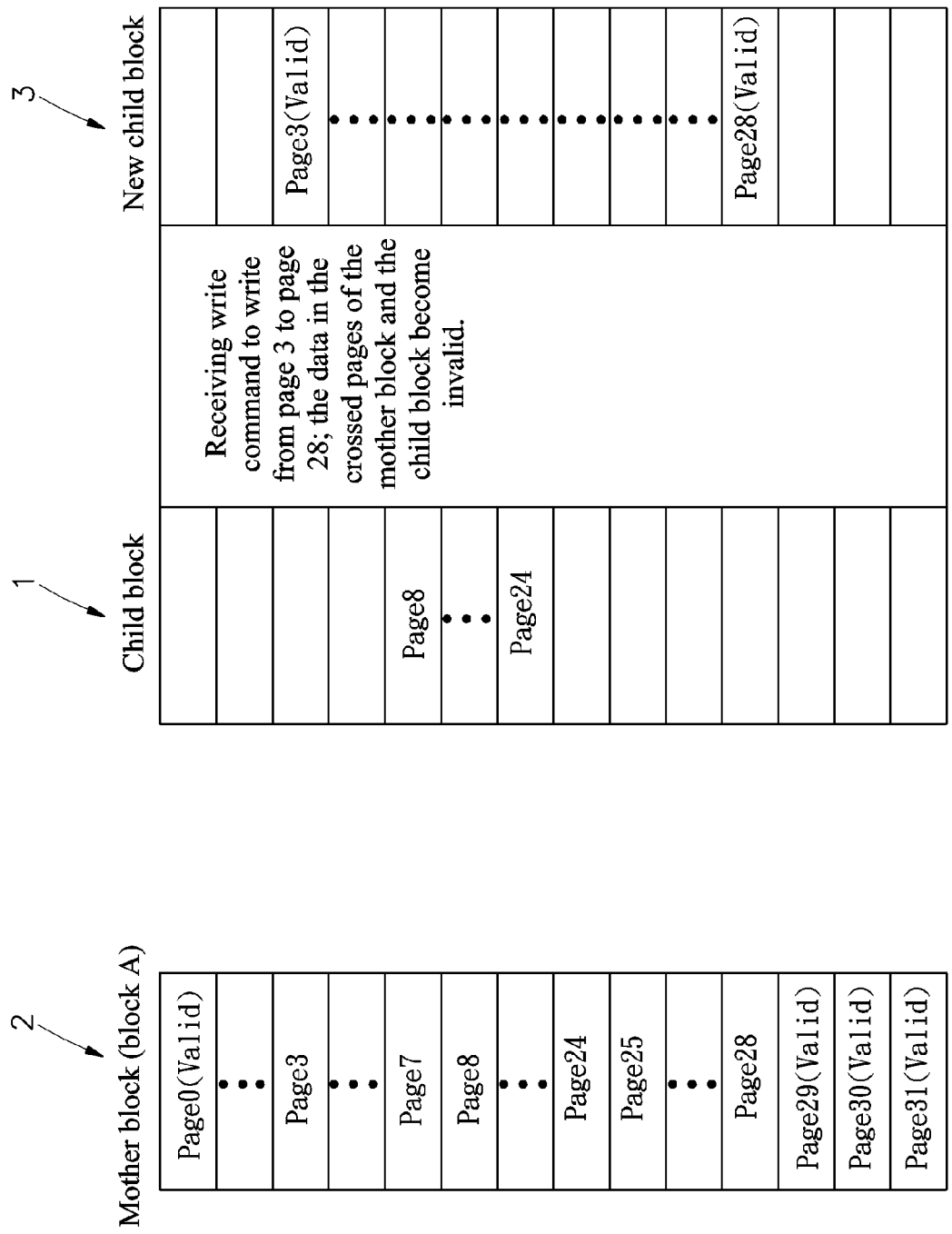
FIG. 12 is a write judging step 3 of a mother and a child block according to an embodiment of the present invention.
Figure 13:
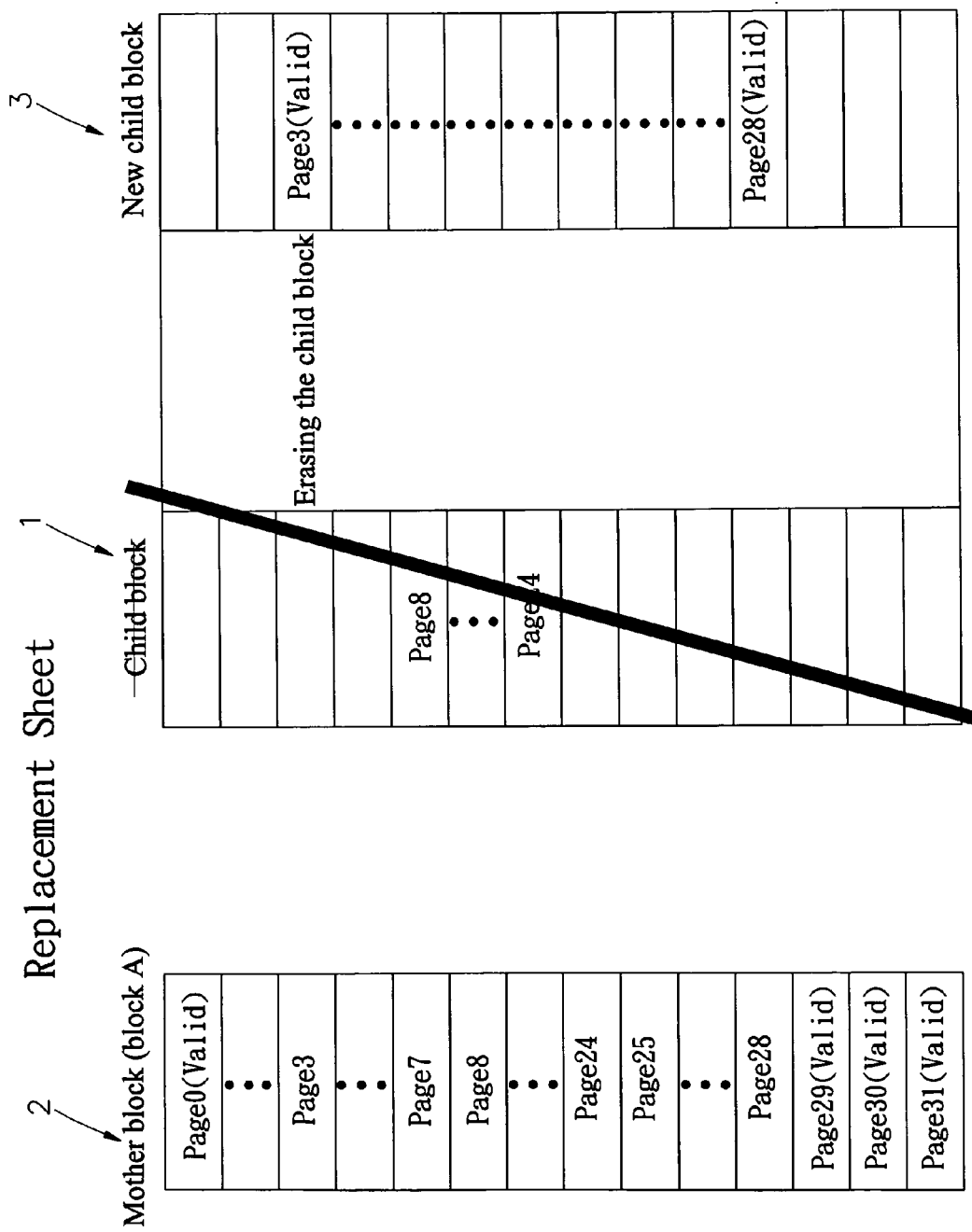
FIG. 13 is a write judging step 4 of a mother and a child block according to an embodiment of the present invention.
Figure 14:
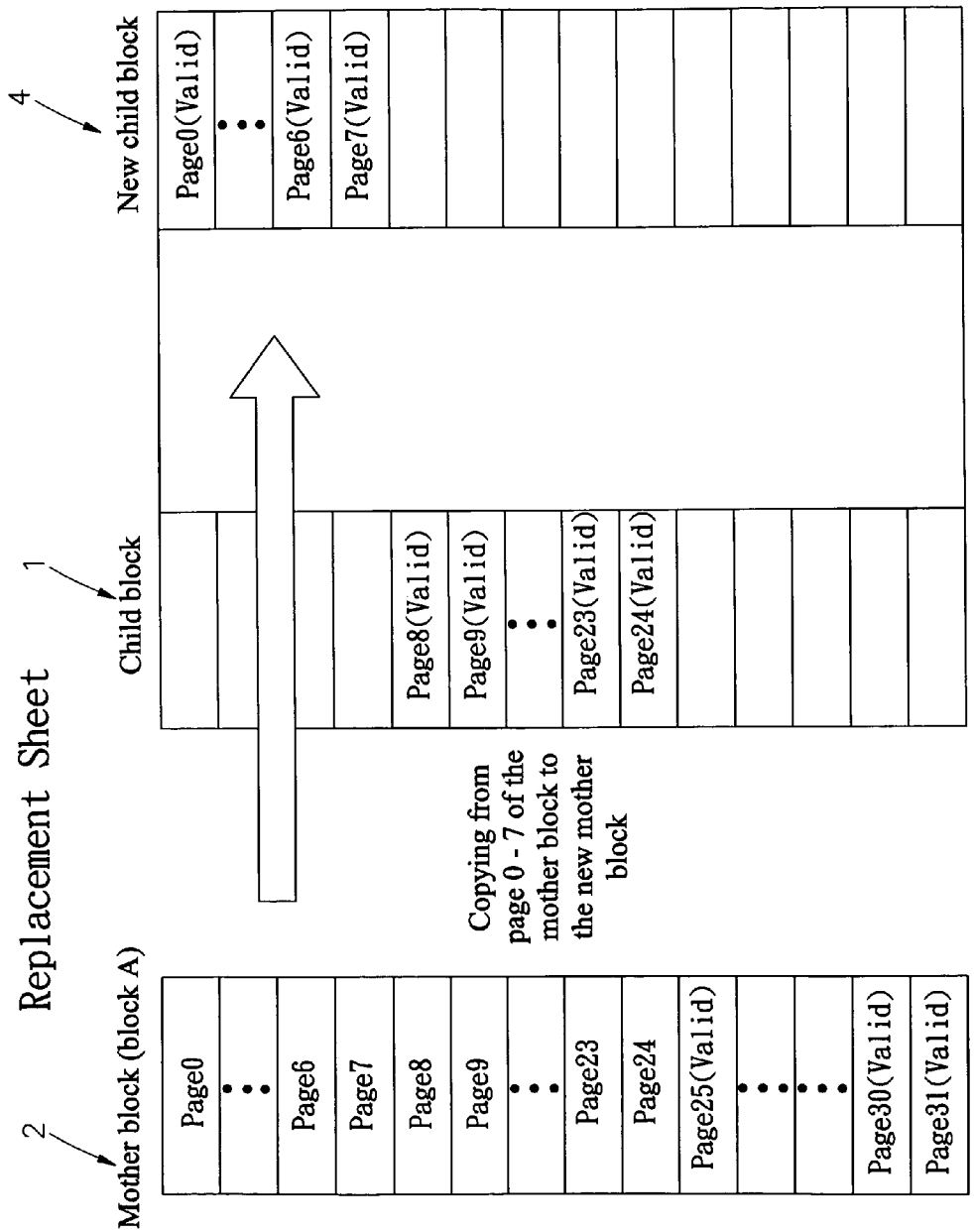
FIG. 14 is a write judging step 5 of a mother and a child block according to an embodiment of the present invention.
Figure 15:
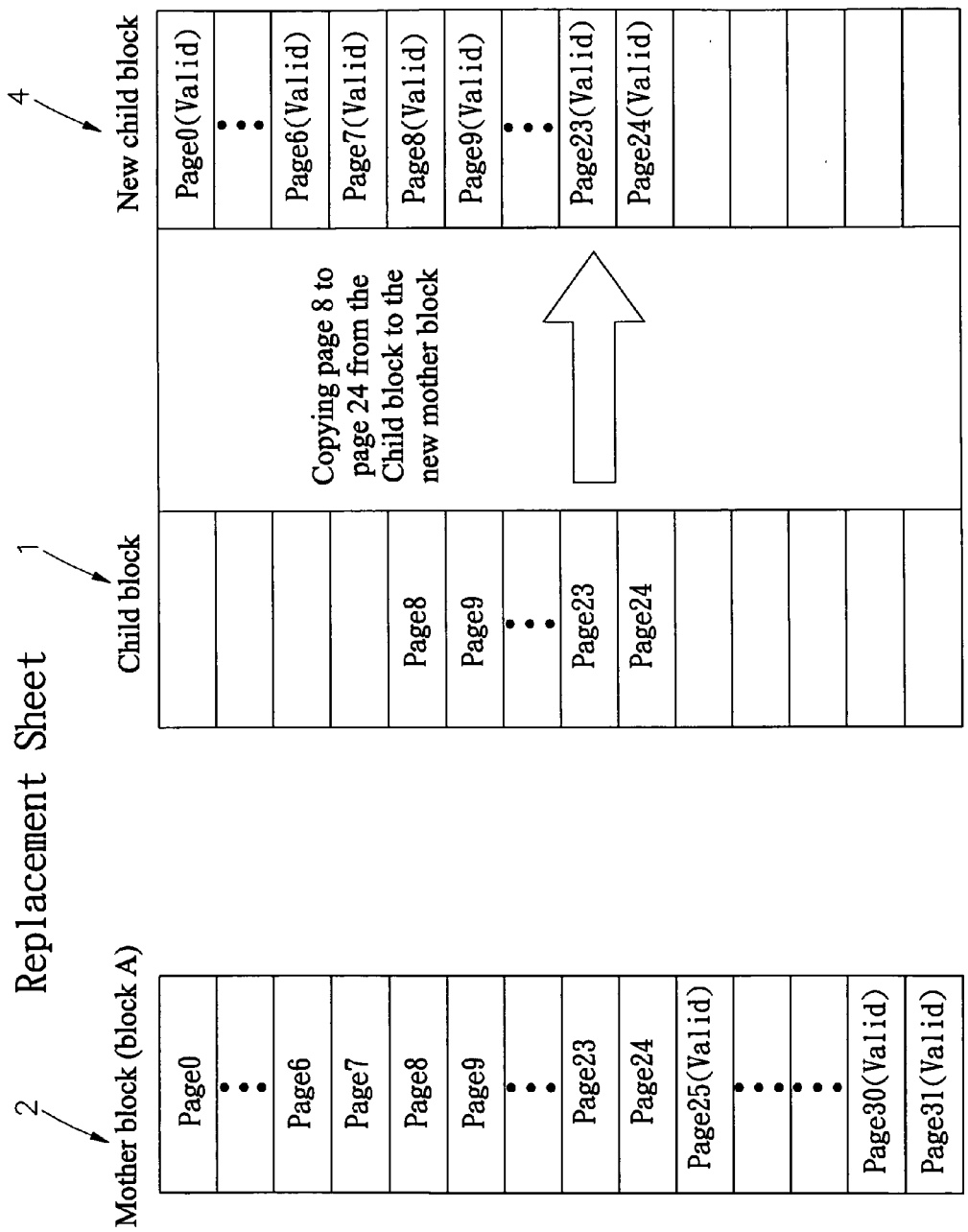
FIG. 15 is a write judging step 6 of a mother and a child block according to an embodiment of the present invention.
Figure 16:
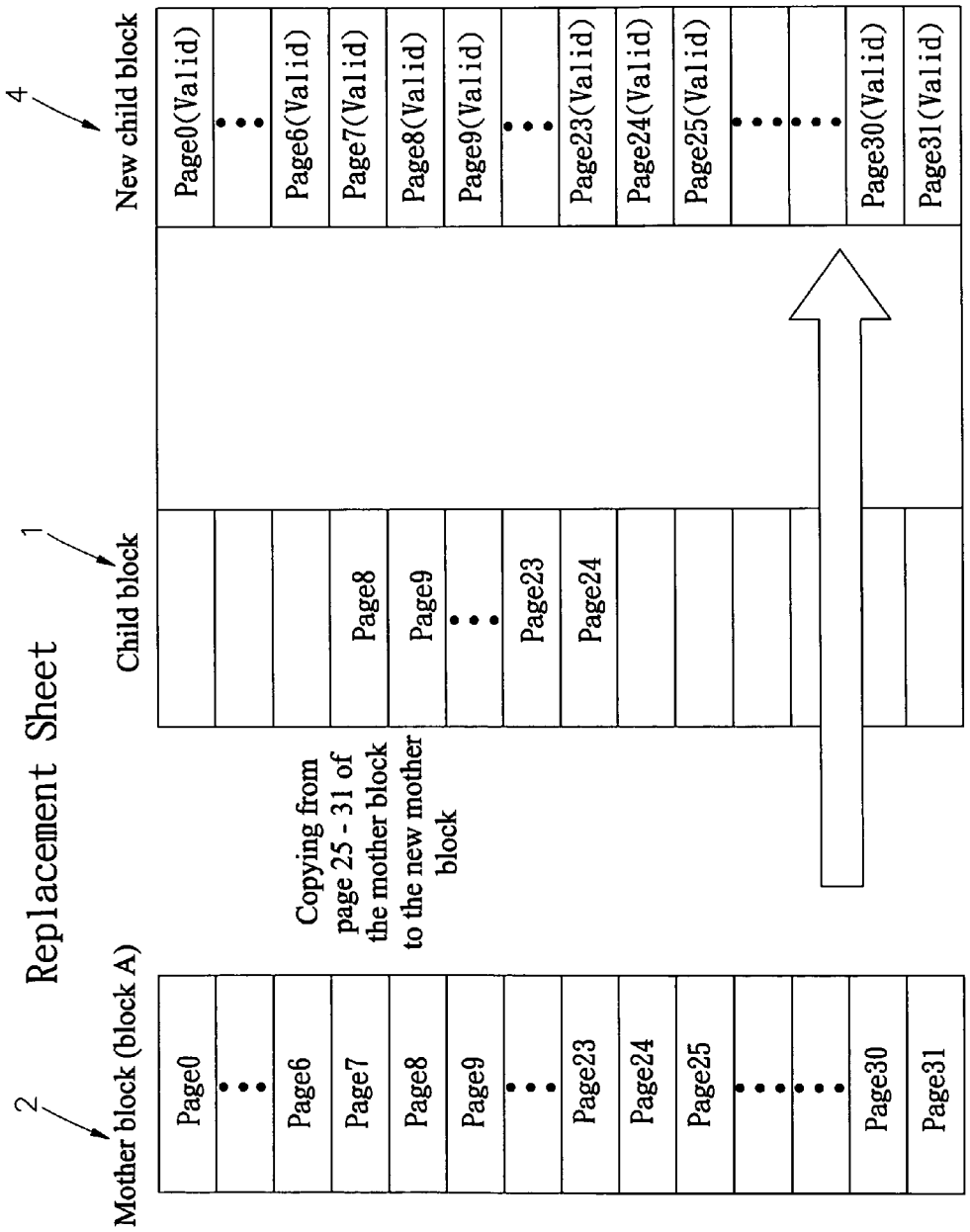
FIG. 16 is a write judging step 7 of a mother and a child block according to an embodiment of the present invention.
Figure 17:
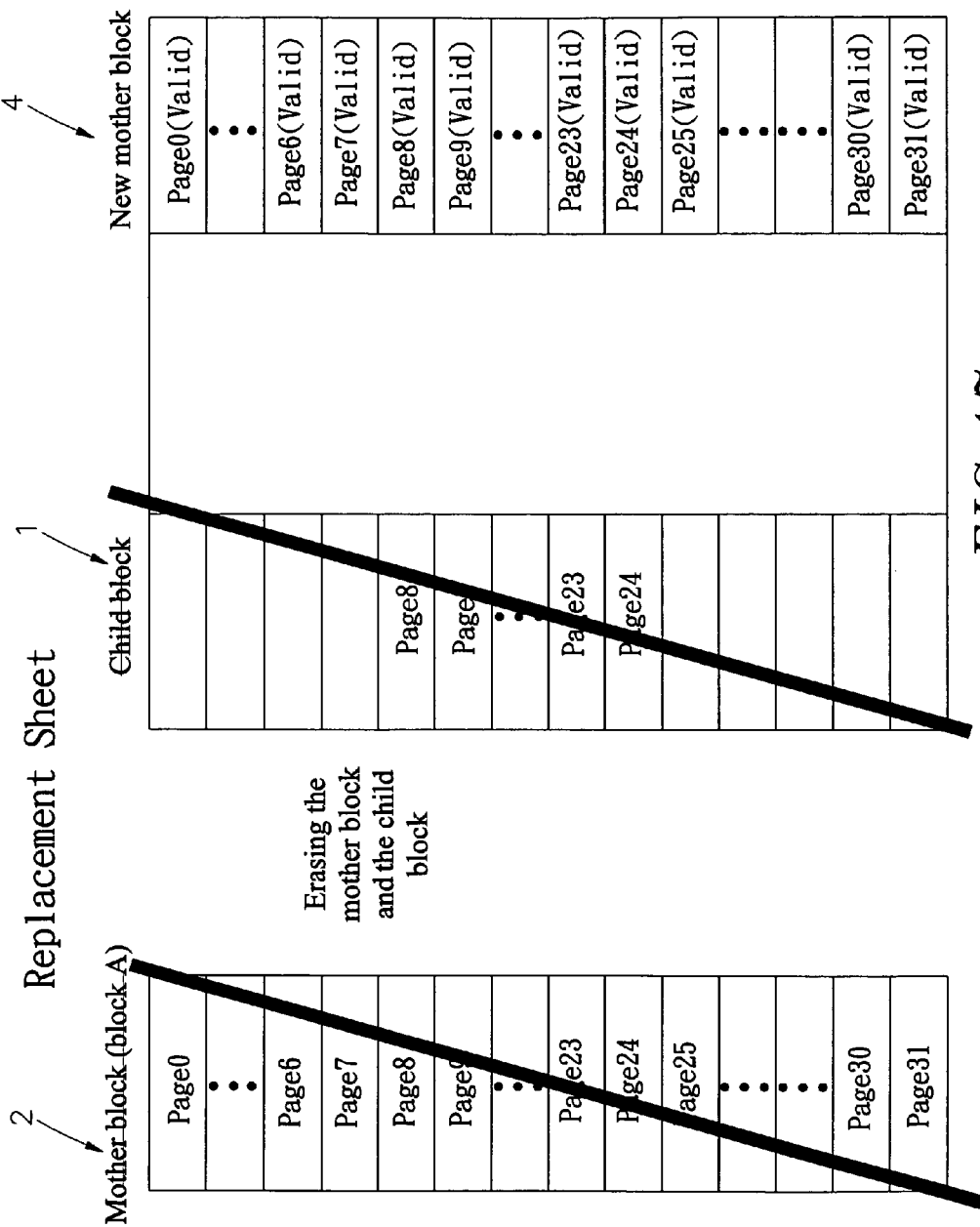
FIG. 17 is a write judging step 8 of a mother and a child block according to an embodiment of the present invention.

Referring FIGS. 7, 8 and 9, the steps 1, 2 and 3 of creating a mother and a child block according to an embodiment of the present invention are shown. When the host issues a command pointing at page 8 to 24 of block A for writing data, the manager finds a new block and defines it as the child block 1, as well as defines block A as the mother block 2. In this way, a set of mother and child block is being built. Next, the manager writes data in an orderly manner starting from page 8 to page 24 of the child block 1. After this writing command is accomplished, the validspace of the mother block 2 is from page 0 to page 7, and from page 25 to page 31; the validspace of the child block 1 is from page 8 to page 24. There are three possibilities that may happen when the host issues a command for writing into the set of mother and child block, as described with reference to FIGS. 10 and 11, the write judging steps 1 and 2 of a mother and a child block according to an embodiment of the present invention. When a new starting page for writing data is behind the ending page, say page 24 of the child block 1, there is no need to create a new child block 1 because the pages behind page 24 of the child block 1 are all empty, and the manager continues to write into the validpages of the child block 1. If the writing of the data starts from page 27 and ends at page 29, the manager, first of all, copies from page 25 to page 26 of the mother block 2 to the child block 1, and then writes the new data from page 27 to page 29 of the child block 1 to accomplish writing procedure. And then the validspaces, page 0 to page 7, and page 25 to page 31, of the mother block 2 are replaced by page 0 to page 7, and page 30 to page 31; the validspaces, page 8 to page 24, of the child block 1 are replaced by page 8 to page 29. If the writing starts from page 25, the manager can directly write from page 25 of the child block 1 since the procedure of coping mother block 2 to the child block 1 is omitted. Furthermore, referring FIGS. 12 and 13, in the write judging steps 3 and 4 of a mother and a child block according to an embodiment of the present invention, if the new writing of data starts from page 3 and ends at page 28, the starting page is or ahead of the starting page, say page 8, of the child block 1, and the ending page is or behind the ending page, say page 24, of the child block 1, in this situation, the manager has to find a new block and define as the new child block 3 as the crossed area is beyond the validrange of the child block 1, and then the data is written in an orderly manner into page 3 to page 28 of the new child block 3. After completing the writing procedure, the manager erases the child block 1 and replaces it by the new child block 3. Now referring to FIGS. 14, 15, 16 and 17, the write judging steps 5, 6, 7 and 8 of a mother and a child block according to an embodiment of the present invention, if the new data writing starts from page 7 and ends at page 23, then the procedure is unlike either one of the above two situations. The manager copies the data stored in the validrange of the mother block 2 and the child block 1 and combines to the new block of which defining as the new mother block 4, then finds a new block as the new child block 5. Then, to command for writing data from page 7 in an orderly manner to page 23 of the new child block 5 and the validpages of the new mother block 4 are page 0 to page 6 and page 24 to page 31, and the validpages of the new child block 5 are page 7 to page 23. However, the new block will be required to be created for meeting the above writing conditions, which possibly end up to the last page, to copy the validpages of the mother block 2 and the child block 1 therein; after the validpages are copied to the new block, then manager erases the mother block 2 and the child block 1 and they become another two new blocks.

Figure 18:
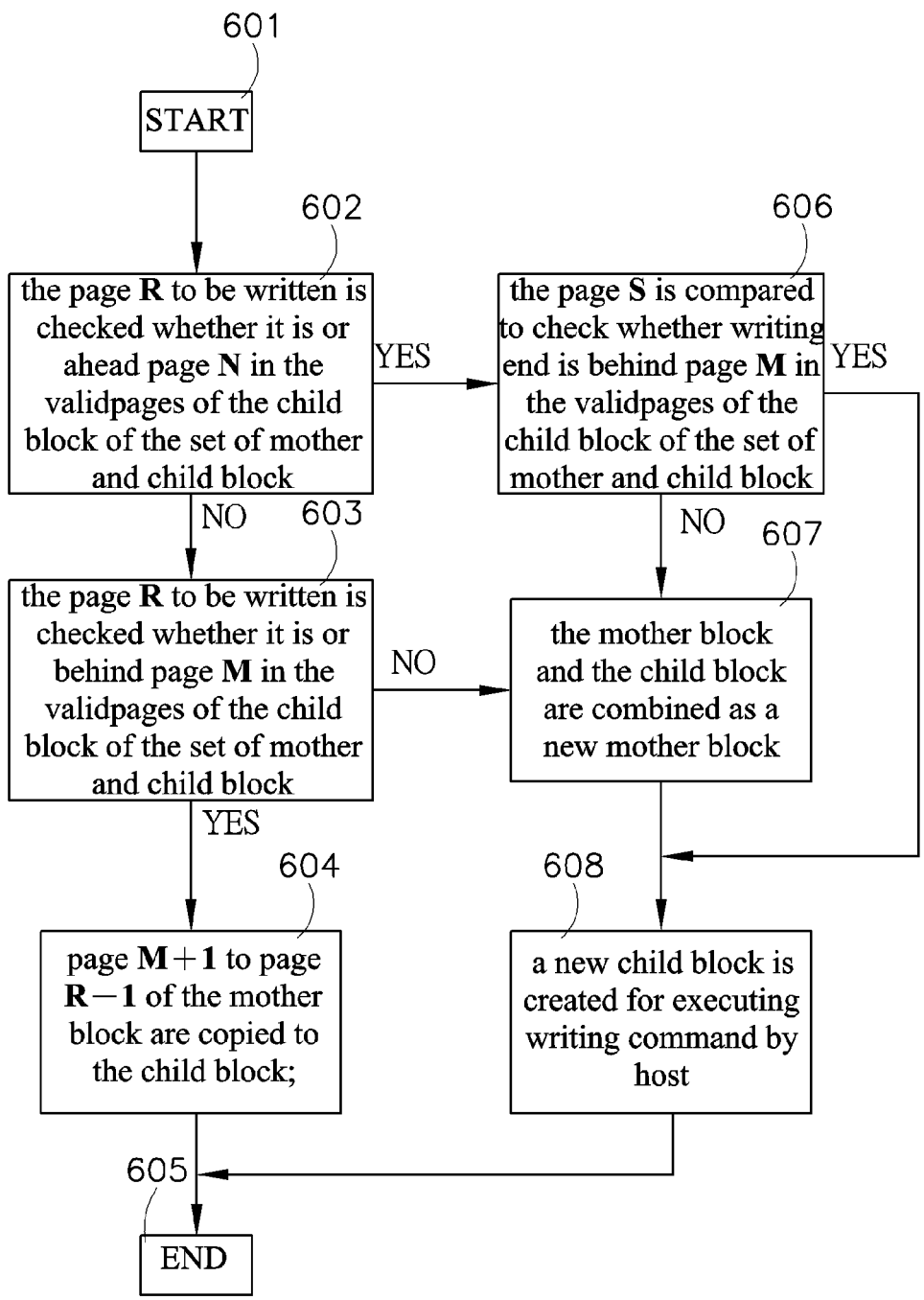
FIG. 18 is a flow chart of a judging procedure according to an embodiment of the present invention.

A judging procedure is set according to the above depiction, referring to FIG. 18, a flow chart of the judging procedure according to an embodiment of the present invention is described. When the host issues a command for writing data to the set of mother and child block, the manager executes the following steps:the procedure starts in step (601);in step (602), the page R to be written is checked whether it is or ahead page N in the validpages of the child block of the set of mother and child block, if no, then the procedure proceeds to step (603) if yes, the procedure proceeds to step (606);in step (603), the page R to be written is checked whether it is or behind page M in the validpages of the child block of the set of mother and child block, if yes, then procedure proceeds to step (604), if not, the procedure proceeds to step (607);in step (604), page M+1 to page R−1 of the mother block are copied to the child block;the writing procedure ends in step (605);in step (606), the page S is compared to check whether writing end is or behind page M in the validpages of the child block of the set mother and child block, if no, then the procedure proceeds to step (607), if yes, the procedure proceeds to step (608);in step (607), the mother block and the child block are combined as a new mother block; and in step (608), a new child block is created to replace the old child block and the procedure proceeds to step (605).

Figure 19:
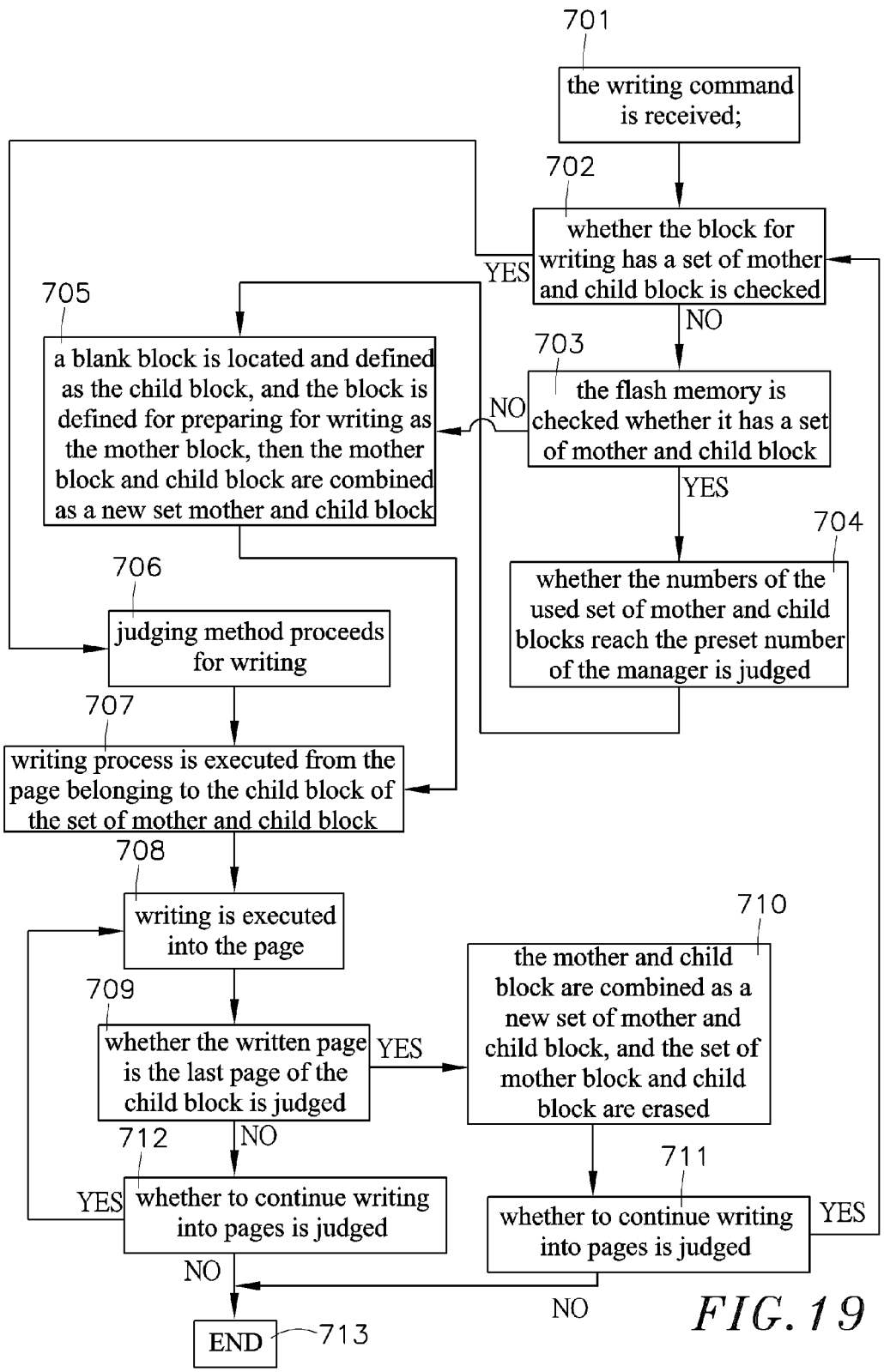
FIG. 19 is a flowchart of a writing procedure according to an embodiment of the present invention.

In file management, FAT1, FAT2 and FDB addresses are altered constantly when the host processes data writing operations. In such a case, if the judging method by using a plurality sets of mother and child blocks is applied therein, not only the efficiency can be upgraded but also the erase frequency of the flash memory can be reduced. Therefore, the above judging method by applying a plurality sets of mother and child blocks can substantially aid in increasing the data storing speed as well as reduce the erasing frequency while the flash memory altering the fixed address. Referring to FIG. 19, a flow chart of a writing procedure according to an embodiment of the present invention, when the manager receives writing command from the host, the procedure for the flash memory is executed as follows:

in step (701), the writing command is received;

in step (702), checking whether a block for writing has a set of mother and child blocks, if yes, the procedure proceeds to step (706), if no, the procedure proceeds to step (703);

in step (703), checking whether the flash memory having a set of mother and child blocks, if yes, the procedure proceeds to step (704), if not, the procedure proceeds to step (705);

in step (704), whether the numbers of the used set of mother and child blocks reach the preset number in the manager is judged, if yes, a set of the mother and child blocks is located and combined as a new block, then this block defined as a mother block and proceeds the step (706), if not, the procedure proceeds to step (705) directly;

in step (705), a blank block is located and defined as a child block, and a block is defined for writing as a mother block, then the mother block and the child block are combined as a new set of mother and child blocks and the procedure continues to proceed to step (706);

in step (706), executing writing;

in step (707), writing process is executed from the page belonging to the child block of the set of mother and child blocks;

in step (708), writing is executed into the page;

in step (709), judging whether the written page is the last page of the child block, if no, the procedure proceeds to step (712), if yes, the procedure proceeds to step (710);

in step (710), the set of mother and child blocks is combined as a new block, and the mother block and the child block in the set of mother block and child blocks are erased, and then the procedure proceeds to step (711);

in step (711), whether to continue writing into pages is judged, if not, the procedure proceeds to step (713), if yes, the procedure proceeds to step (702);

in step (712), whether to continue writing into the pages is judged, if not, the procedure proceeds to step (713), if yes, the procedure proceeds to step (708); and in step (713), the writing operation ends.

According to the above description, the storage controlling and judging methods of the flash memory of the present invention can substantially upgrade the data storing speed and reduce the erase frequency of the flash memory.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and nonlimiting sense.

The invention claimed is:

1. A storage controlling and judging method of a flash memory for writing data to said flash memory, the flash memory comprising a plurality of sets of mother and child blocks, each set of said mother and child blocks having a mother block and a child block corresponding to said mother block for increasing data storage speed of said flash memory and using a correlation between said mother block and said child block of said sets of mother and child blocks to substantially reduce erasing frequency of said flash memory for extending a service life thereof; the method comprising:

(a) receiving writing command;

(b) checking whether an address to be written is in said sets of mother and child blocks, wherein if the address to be written is not in said sets of mother and child blocks, proceed to step (c), and wherein if the address to be written is in said sets of mother and child blocks, proceed to step (e);

(c) checking whether said flash memory has a plurality of sets of mother and child blocks, wherein if said flash memory has the plurality of sets of mother and child blocks, proceed to step (d);

(d) judging whether numbers of used sets of mother and child blocks reach a preset number in a manager, wherein if the numbers of the used sets of mother and child blocks do not reach the preset number in said manager, one of the used sets of mother and child blocks is found and combined to create a new block, a blank block is found and defined as a child block, and a block defined for writing as a mother block, and then said mother block and said child block are combined to create a new set of mother and child blocks, then proceed to step (e);

(e) executing writing;

(f) executing writing from pages in said child block of said set of mother and child blocks;

(g) executing writing into said pages;

(h) judging whether a written page is a last page in said child block, wherein if the written page is not the last page in said child block, proceed to step (i);

(i) judging whether to continue writing into said pages, wherein if not to continue writing into said pages, proceed to step (j); and (j) end writing operation.

2. The storage controlling and judging method of the flash memory according to claim 1, wherein the operation proceeds to step (l) if said flash memory does not have the plurality of sets of mother and child blocks in said step (c);

(l) a blank block is found and defined as a child block, and said meter block and said child block are combined as a new set of mother and child blocks, then proceed to step (e).

3. The storage controlling and judging method of the flash memory according to claim 1, wherein the operation proceeds to step (k) if the numbers of the used sets of meter and child blocks do not reach the preset number in said manager in said step (d);

(k) a blank block is found and defined as a child block, and a block for writing is defined as a mother block, and then said mother block and said child block are combined as a new set of mother and child blocks, then proceed to step (e).

4. The storage controlling and judging method of the flash memory according to claim 1, wherein the operation proceeds to step (m) if the written page is the last page in said child block in said step (h);

(m) said set of mother and child block is combined as a new set of mother and child blocks and a mother block and a child block in said set of mother and child blocks are erased, then proceed to step (i) to judge whether or not to continue writing into said pages, if to continue writing in said pages, proceed to step (g).

5. A storage controlling and judging method of a flash memory for writing data into said flash memory, said judging method comprising:

(i) starting the judging method;

(ii) checking whether a starting page R for writing is at or ahead a valid-starting page N in a child block of a set of mother and child blocks;

wherein if the starting page R for writing is at or ahead the valid-starting page N in the child block of the set of mother and child blocks, proceed to step (iii);

(iii) comparing whether an ending page S for writing is at or behind valid-ending page M in said child block of said set of mother and child blocks;

wherein if the ending page S for writing is at or behind the valid-ending page M in said child block of said set of mother and child blocks, proceed to step (iv);

(iv) erasing said child block and replacing a new block to create a child block and writing data therein; and (v) ending the judging method.

6. The storage controlling and judging method of the flash memory according to claim 5, wherein if the starting page R for writing is not at or ahead the valid-starting page N in the child block of the set of mother and child blocks in said step (ii), then check whether said starting page R for writing is behind said valid-ending page M in said child block of said set of mother and child blocks;

wherein if said starting page R for writing is behind said valid-ending page M in said child block of said set of mother and child blocks, proceed to step (vi);

(vi) pages (M+1) to (R−1) are copied from said mother block of said set of mother and child blocks to said child block, and continued to write data therein; otherwise, if said starting page R for writing is not behind said valid-ending page M in said child block of said set of mother and child blocks, proceed to step (vii);

(vii) said mater block and said child block of said set of mother and child blocks are combined as a new mother block, then a new child block is created to join said new mother block as a new set of mother and child blocks to continue writing data, and proceed to step (v).

7. The storage controlling and judging method of the flash memory according to claim 6, wherein if the ending page S for writing is not at or behind the valid-ending page M in said child block of said set of mother and child blacks in step (iii), proceed to step (vii).

* * * * *